United States Patent [19]

Meidan et al.

[11] Patent Number: 5,678,187
[45] Date of Patent: *Oct. 14, 1997

[54] METHOD AND APPARATUS FOR REDUCING INTERFERENCE IN A RADIO COMMUNICATION LINK OF A CELLULAR COMMUNICATION SYSTEM

[75] Inventors: Reuven Meidan, Ramat Hasharon; Noam Livneh, D.N. Misgav; Giora Silbershatz, Haifa; Mordechai Ritz, Givat-Elah, all of Israel

[73] Assignee: Motorola, Inc., Schaumburg, Ill.

[*] Notice: The term of this patent shall not extend beyond the expiration date of Pat. No. 5,428,818.

[21] Appl. No.: 491,272

[22] Filed: Jun. 16, 1995

Related U.S. Application Data

[62] Division of Ser. No. 182,526, Jan. 18, 1994, Pat. No. 5,428,818, which is a continuation of Ser. No. 793,905, Nov. 11, 1991, abandoned.

[30] Foreign Application Priority Data

Nov. 10, 1991 [IL] Israel ......... 100028

[51] Int. Cl.⁶ ......... H04Q 7/36
[52] U.S. Cl. ......... 455/33.3; 455/33.4; 455/34.1; 455/62; 455/63
[58] Field of Search ......... 455/33.1, 33.2, 455/33.3, 33.4, 63, 62, 54.1, 54.2, 56.1, 67.1, 67.3, 272, 103, 104, 105, 59, 60, 61, 34.1, 34.2; 379/58, 59, 60, 63

[56] References Cited

U.S. PATENT DOCUMENTS

| | | | |
|---|---|---|---|
| 4,932,049 | 6/1990 | Lee | 455/33.3 |
| 5,428,818 | 6/1995 | Meidan et al. | 455/33.4 |

*Primary Examiner*—Nguyen T. Vo
*Attorney, Agent, or Firm*—Raymond J. Warren

[57] ABSTRACT

A method and apparatus is provided for reducing interference in a radio communication link from a central site (230) to a mobile unit (228) in a cellular communication system. The central site (230) includes a first (202) and a second (216) antenna which serve the geographic region (214) in which the mobile unit (228) is located. The radio communication link may be provided by communicating a signal in a first radio communication channel between the first central site antenna (202) and the mobile unit (228). Similarly, the radio communication link may be provided by communicating a signal in a second radio communication channel between the second central site antenna (216) and the mobile unit (228). A measure of interference in the first radio communication channel providing the radio communication link is determined. The radio communication link is switched, in response to the measure of interference being above a predetermined threshold, from the first to the second radio communication channel.

7 Claims, 2 Drawing Sheets

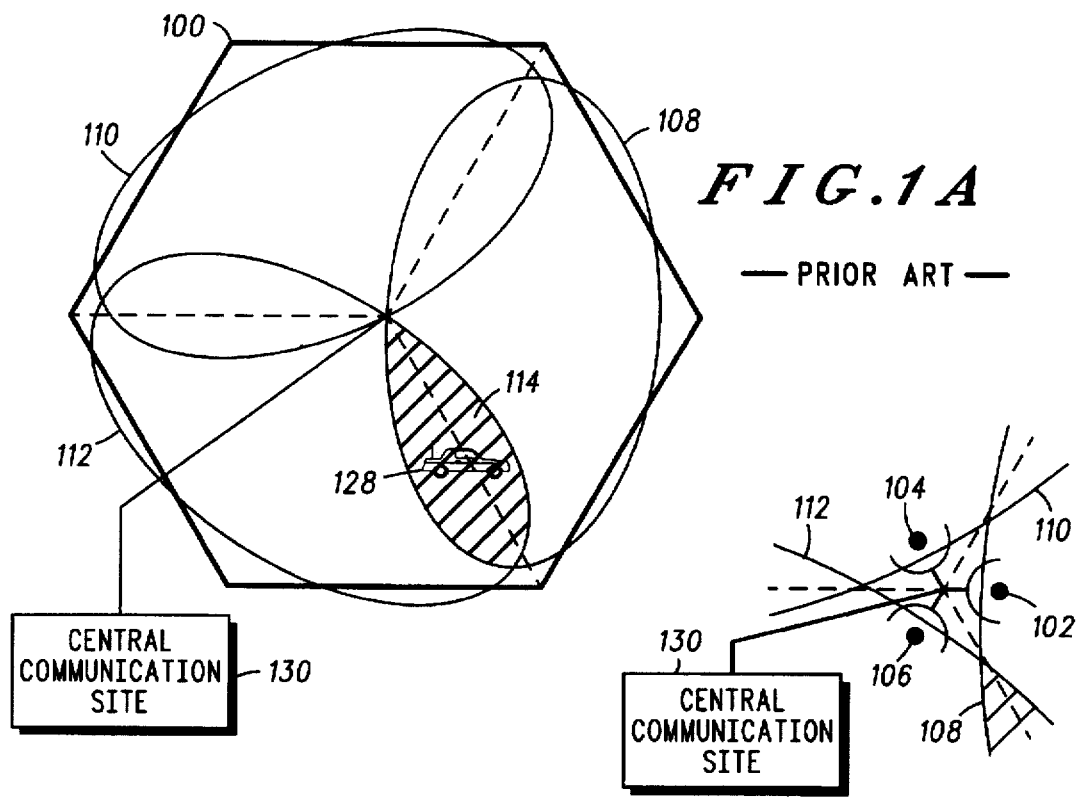
*FIG. 1A*
— PRIOR ART —
*FIG. 1B*
— PRIOR ART —
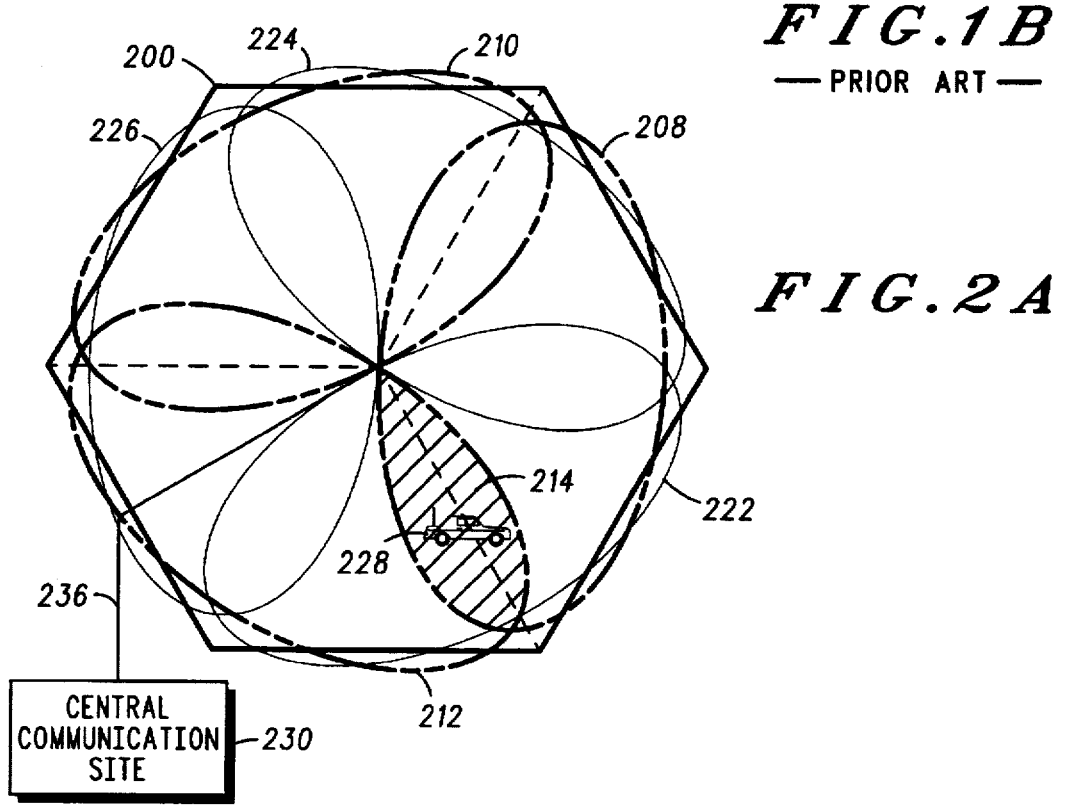
*FIG. 2A*

METHOD AND APPARATUS FOR REDUCING INTERFERENCE IN A RADIO COMMUNICATION LINK OF A CELLULAR COMMUNICATION SYSTEM

This is a division of U.S. Ser. No. 08/182,526 filed Jan. 18, 1994, now U.S. Pat. No. 5,428,818 granted on Jun. 27, 1995, which is a continuation of Ser. No. 07/793,905, filed Nov. 11, 1991, now abandoned.

FIELD OF THE INVENTION

The present invention relates to cellular communication systems and, more particularly, to a method and apparatus for reducing interference in a radio communication link of a cellular communication system.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is typically referred to as modulation. The function of the channel is to provide a physical connection between the transmitter output and the receiver input. The function of the receiver is to process the received signal so as to produce an estimate of the original message signal. This processing of the received signal is referred to as demodulation and detection.

Two types of two-way communication channels exist, namely, point-to point channels and point-to-multipoint channels. Examples of point-to-point channels include wirelines (e.g., local telephone transmission), microwave links, and optical fibers. In contrast, point-to-multipoint channels provide a capability where many remote stations may communicate simultaneously with a single central communication site (e.g. cellular radio telephone communication system). These point-to-multipoint systems are also termed Multiple Address System (MAS).

The use of modulation permits multiplexing, that is, the simultaneous transmission of signals from several message sources over a common channel. Also, modulation may be used to convert the message signal into a form less susceptible to noise and interference.

For multiplexed communication systems, the system typically consists of many remote units (i.e. mobile communication units) which require active service over a communication channel for a short or discrete portion of the communication channel resource rather than continuous use of the resources on a communication channel. Therefore, communication systems have been designed to incorporate the characteristic of communicating with many remote units for brief intervals on the same communication channel. These systems are termed multiple access communication systems.

One type of multiple access system is a cellular radio communication system. Cellular radio communication systems typically include a number of central communication base sites. Each central communication site has a service area coverage for servicing mobile communication units within the service area. The service areas typically are arranged such that adjacent central communication site service coverage areas overlap in a manner that provides a substantially continuous service region. The substantially continuous service region provides uninterrupted service by handing off mobile communication units from one central communication site serving a service area to an adjacent central communication site serving another service area.

Communication between the central communication sites and mobile communication units typically occurs on a pair of communication resources or channels (i.e., transmit and receive channels) assigned according to a cellular communication system communication resource reuse plan.

To limit noise in cellular communication systems due to communication between other mobile communication units in other nearby service areas serviced by the central communication sites as well as increase the capacity of the cellular communication system, reuse of the available, but limited number of communication resources is done within a service region of the cellular communication system. In the past, in order to ensure that the reuse of communication resources does not cause unacceptable noise in the communication channel, service regions of central communication sites which have been allocated the same communication resources have been geographically separated. By having sufficient geographic separation, a particular type of noise (i.e. co-channel interference) in the communication channel is limited. However, the geographic separation needs to ensure an adequate signal to noise ratio (negligible noise in the communication channel) limits the capacity of the communication system because not all of the available communication resources may be used in each service area.

To enhance the efficiency of communication resource reuse and to improve capacity of the cellular communication system, service areas of central communication sites can be divided into sectors, wherein within each sector all or part of the available communication resources, (i.e., communication channels) is allocated. By having the service area divided into sectors, the required geographic separation may be reduced while maintaining an adequate signal to noise ratio. For example, U.S. Pat. No. 4,128,740, assigned to Motorola, Inc. discloses a four cell (service area) - six sector communication resource reuse pattern. As disclosed, each cell is divided into six sectors and each sector contains approximately 1/24th of the available communication resources. For every four cell sites, the communication resource pattern is repeated. This communication resource reuse pattern may be further reduced to a 1 cell site reuse pattern as disclosed in pending U.S. Pat. No. 5,355,367 by Comroe et al. which was granted Oct. 11, 1994 and also assigned to Motorola, Inc. It will be appreciated by those skilled in the art many other reuse patterns exist for use in cellular communication systems including but not limited to 3, 7, 21, 49, 63, 91 site reuse patterns.

In addition, several reuse patterns have also been used simultaneously in cellular communication systems. U.S. Pat. No. 4,144,411 issued to Frenkiel on Mar. 13, 1979, teaches one such cellular system in which static reuse of frequencies in a large-cell frequency reuse pattern an in a miniature-sized overlaid, but same type frequency reuse pattern. The miniature-sized reuse pattern and the large-cell patterns are beth on seven-cell reuse patterns. This is achieved through yet lower transmit powers and maintaining the same site sparing to cell radius as the large-cell. This concept is one method of improving frequency reuse of traffic channels in a geographic region. The decision to handoff from an overlaid serving cell to an underlaid cell is based on whether a subscriber's received signal strength (RSS) is greater than a threshold set for the overlaid cell. If the RSS is equal to or less than the predetermined threshold, a check is made to see if there is a large-cell channel available.

An enhancement to Frenkiel is discussed in an article authored by Samuel W. Halpern entitled "*Reuse Partitioning in Cellular Systems*", presented at the 33rd IEEE Vehicular Technology Conference on May 25–27, 1983 in Toronto, Ontario, Canada. The Halpern article sets forth a cellular system having multiple reuse levels (or patterns) within a given geographical area. A reuse level refers to a particular channel reuse pattern whether the channel is based on frequency, time slots, codes, or other suitable divisions. For example, a cluster of cells normally employing a seven-cell reuse pattern may simultaneously operate on a three-cell reuse pattern whereby one set of frequencies is dedicated to the three-cell reuse pattern while another set of frequencies is dedicated to the nine-cell reuse pattern. This division of frequency spectrum into two groups of mutually exclusive channels is one method of providing multiple reuse patterns. Consequently, one cell site may operate on both a nine-cell and a three-cell reuse pattern by using channels from its channel set which are dedicated to specific cell sites and assigned to the different reuse patterns. Such smaller reuse patterns form a noncontiguous overlay of cells having a decreased radius.

It will be appreciated by those skilled in the art that communication resources or channels may be distinct frequencies (i.e., a frequency-division multiple access (FDMA) communication system). However, other types of communication resources or channels exist which may be assigned according to a communication reuse separation pattern. These other communication resources include data channels and traffic channels, which may be time slots within the same frequency such as in a time division multiple access (TDMA) system, or traffic channels and data channels in other types of channelized systems such as code division multiple access (CDMA) systems.

One type of communication system which can be a CDMA system is a spread spectrum system. Three general types of spread spectrum communication techniques exist, including:

Direct Sequence
  The modulation of a carrier by a digital code sequence whose bit rate is much higher than the information signal bandwidth. Such systems are referred to as "direct sequence" modulated systems.

Hopping
  Carrier frequency shifting in discrete increments in a pattern dictated by a code sequence. These systems are called "frequency hoppers." The transmitter jumps from frequency to frequency within some predetermined set; the order of frequency usage is determined by a code sequence. Similarly "time hopping" and "time-frequency hopping" have times of transmission which are regulated by a code sequence.

Chirp
  Pulse-FM or "chirp" modulation in which a carrier is swept over a wide band during a given pulse interval.

Spread spectrum communication systems can be implemented as multiple access systems in a number of different ways. One type of multiple access spread spectrum system is a CDMA system. CDMA spread spectrum systems may use direct sequence (DS-CDMA) or frequency hopping (FH-CDMA) spectrum spreading techniques. FH-CDMA systems can further be divided into slow frequency hopping (SFH-CDMA) and fast frequency hopping (FFH-CDMA) systems. In SFH-CDMA systems several data symbols, representing a sequence of data bits which are to be transmitted, modulate the carrier wave within a single hop. Whereas, in FFH-CDMA systems the carrier wave hops several times per data symbol.

In a SFH-CDMA system, communication between two communication units in a particular communication channel is accomplished by using a frequency synthesizer to generate a carrier wave in a particular portion of a predetermined broad frequency band for a brief period of time. The frequency synthesizer uses an input spreading code to determine the particular frequency from within the set of frequencies in the broad frequency band at which to generate the carrier wave. The spreading code may, for example, be a pseudo-noise (PN) code or a Walsh code. Spreading codes are input to the frequency synthesizer by a spreading code generator. The spreading code generator is periodically clocked or stepped through different transitions which causes different or shifted spreading codes to be output to the frequency synthesizer. Therefore, as the spreading code generator is periodically clocked, then so too is the carrier wave frequency hopped or reassigned to different portions of the frequency band. In addition to hopping, the carrier wave is modulated by data symbols representing a sequence of data bits which are to be transmitted. A common type of carrier wave modulation used in SFH-CDMA systems is M-ary phase shift keying (MPSK), where $k=\log_2 M$ data symbols are used to determined which one of the M phases is to be transmitted.

In a SFH-CDMA system, the communication resource reuse separation pattern can be reduced to a single cell service area such that each cell is operating in the same frequency bandwidth. In addition, each cell can be further divided into sectors. Similarly, the communication resource reuse separation pattern can further be reduced to a single sector of each cell such that each sector of each cell is operating in the same frequency bandwidth. Such proximity of the reuse of frequencies in the communication resource reuse separation pattern is possible because the individual channels are separated by codes and not necessarily by frequencies. The individual codes are also reused according to the communication resource reuse separation pattern. However, in a SFH-CDMA system all of the codes which form a minimally correlated set of orthogonal codas may be reused in all of the sectors of each cell.

Using all of the codes in the same frequency band in each sector of each cell increases the overall level of noise due to co-channel interference (i.e., number of simultaneous communications in the same frequency and code division) of the CDMA communication system. The signal quality and thus the effect of the level of noise may be measured by the quality of recovery of the transmitted information signal from the communication channel. In digital communication of analog signals (e.g., voice signals), signal quality is determined by the bit error rate (BER) of the channel (i.e., the number of errors in the recovery of the transmitted signal bits over a particular time span). As the bit error rate increases the quality of the signal received by the receiving communication unit decreases. As a result, communication system typically are designed to limit the BER to an upper bound or maximum so that the degradation in the quality of the received signal is limited. Thus, since the noise is largely related to the number of users using the same communication channel, the maximum BER is limited by limiting the number of simultaneous code divided users in the communication channel.

BER is related to the carrier to interference (C/I) power ratio. If the C/I power ratio increases, then the BER decreases and the signal quality improves. If the C/I power ratio decreases, then the BER increases and the signal quality deteriorates. The goal of reducing interference in the communication link may be achieved by improving the C/I power ratio.

Code division of multiple communication channels in the same frequency bandwidth may be done by the assignment or allocation of portions of the broad frequency bandwidth to each particular channel. A plurality of spreading codes are used to assign portions of the frequency band to different channels during the same time period. As a result, transmitted signals are in the same broad frequency band of the communication resource, but within unique portions of the broad frequency band assigned by the unique spreading codes. These unique spreading codes preferably are orthogonal to one another such that the cross-correlation between the spreading codes is zero. Particular transmitted signals can be retrieved from the communication channel by despreading a signal representative of the sum of signals in the communication channel with a spreading code related to the particular transmitted signal which is to be retrieved from the communication channel. Further, when the spreading codes are orthogonal to one another, the received signal can be correlated with a particular spreading code such that only the desired signal related to the particular spreading code is enhanced while the other signals are not enhanced.

After allocating a code divided communication resource according to the communication resource reuse separation pattern for use by the mobile communication unit, the local central communication site typically allocates a transceiver typically located at the local central communication site to service any subsequent communication with the mobile communication unit on the assigned communication channel resource. The transceiver is typically coupled to an antenna which serves the particular geographic region in which the mobile communication unit is located. The transceiver of the central communication site will subsequently route the communications of the mobile communication unit to a target communication unit. The target communication unit may be either another mobile communication unit within the same service area, a mobile communication unit in another service area, or a subscriber on the public switched telephone network (PSTN).

There exists a need for reduction of co-channel interference in the communication links between the central communication site and mobile communication unit when the mobile communication unit is located within a region served by more than one antenna operating in the same communication channel band.

SUMMARY OF THE INVENTION

A method and apparatus is provided for reducing interference in a radio communication link from a central site to a mobile unit in a cellular communication system. The central site includes a first and a second antenna which serve the geographic region in which the mobile unit is located. The radio communication link may be provided by communicating a signal in a first radio communication channel between the first central site antenna and the mobile unit. Similarly, the radio communication link may be provided by communicating a signal in a second radio communication channel between the second central site antenna and the mobile unit. A measure of interference in the first radio communication channel providing the radio communication link is determined. The radio communication link is switched, in response to the measure of interference being above a predetermined threshold, from the first to the second radio communication channel.

BRIEF DESCRIPTION OF THE DRAWINGS

FIG. 1A and FIG. 1B are block diagrams showing a prior art central communication site antenna pattern.

FIG. 2A and FIG. 2B are block diagrams showing a preferred embodiment central communication site antenna pattern.

DETAILED DESCRIPTION

Figure 2B:
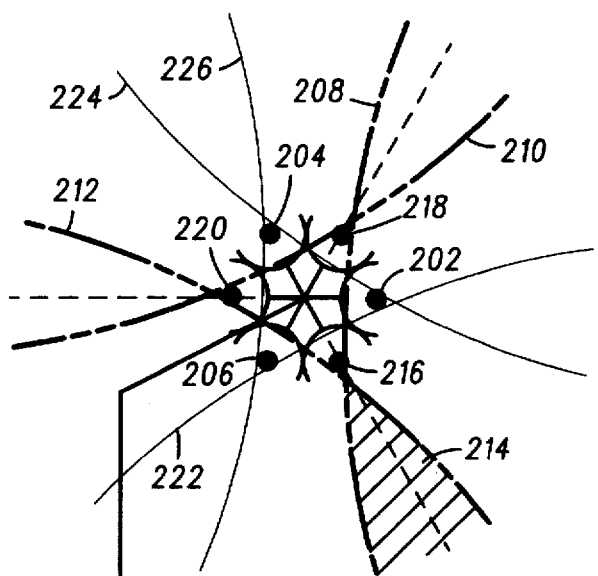

Referring now to FIG. 1A and FIG. 1B, a cell 100 geographic service coverage area scheme of a prior art cellular communication system is shown. Cell 100 is sectorized into three geographic service regions which are each served by a central communication site 130 having a single antenna 102, 104 and 106, respectively. Each antenna 102, 104, and 106 has a corresponding radiation pattern 108, 110, and 112, respectively, which generally covers only one geographic sector or service region of the cell 100. However, sectorized antennae radiation patterns are not typically shaped exactly like a sector of cell, rather antennae radiation patterns typically have a curved shape which can be manipulated to closely follow the rigid shape of a sector. Due to these curved shapes and a communication system constraint to provide all regions of a coil with service coverage from at least one antenna, the radiation patterns of the sectorized antennae will have overlapping regions in which two or more sectorized antennae provide service. For example, overlapping service region 114 may exist between antenna radiation patterns (i.e., antenna service regions) 108 and 112. Within this overlapping service region 114 a mobile communication unit 128 may receive two different signals in a single communication channel from the central communication unit 130 as transmitted from antenna 102 and 106, respectively. Also, a mobile communication unit 128 within this overlapping service region may transmit a signal in a communication channel which is received by both antennas 102 and 106 of central communication unit 130. It will be appreciated by those skilled in the art that a mobile communication unit 128 may be a radio communication unit which is capable of moving around to various service regions or is fixed to a particular location within a particular service region.

In an SFH-CDMA cellular communication system, each of antenna service regions 108 and 112 may be assigned according to a communication channel reuse plan to operate within the same frequency band. Also, each antenna service region 108 and 112 may be assigned according to the communication channel reuse plan to use the same codes to separate communication channels within the frequency band. These codes assign distinct portions of the frequency band to different channels at different instances of time. Consequently, regardless of whether or not the two antenna service regions 108 and 112 channel assignments (also assignment of frequency band portions) are synchronized, a mobile communication unit 128 within overlapping service region 114 may receive a signal from the central communication site 130 in a particular frequency band assigned for use by a communication channel operating in antenna service region 108 as well as another communication channel operating in antenna service region 112. However, the mobile communication unit 128 having a radio communication link with the central communication site 130 would only be expecting a signal in the particular portion of the frequency band which is providing a communication channel from only one of the two antennae 102 and 106 (e.g., antenna 102) serving, respectively, antenna service regions 108 and 112. Therefore, the other signal transmitted by the other antenna (e.g., antenna 106) in the particular portion of the frequency band providing the communication channel would interfere with the radio communication link's expected signal. Such interference is known as co-channel interference.

Similarly, a mobile communication unit 128 having a radio communication link with central communication site 130 in the overlapping service region 114 may transmit a signal in a particular portion of the frequency band assigned for use by a communication channel operating in antenna service region 108 to antenna 102. However, antenna 106 would also receive the mobile communication unit's 128 transmitted signal. But, antenna 106 may be providing a radio communication link between the central communication site 130 and another mobile communication unit located in service region 112 through another communication channel which is assigned the same particular portion of the frequency band. As a result the signal transmitted by the mobile communication unit 128 in the communication channel would interfere with the radio communication link between the other mobile communication unit and antenna 106. Such interference is also known as co-channel interference.

A preferred embodiment of the present invention as shown in FIG. 2A and FIG. 2B reduces the impact that these overlapping service regions have on radio communication links between the central communication site 230 and a mobile communication unit 228. A preferred embodiment cell 200 geographic service coverage area scheme of a cellular communication system is shown. Cell 200 is sectorized into three geographic service regions which are each served by a central communication site 230 having a single antenna 202, 204 and 206, respectively. It will be appreciated by those skilled in the art that the cell may be sectorized into more or less sectors without departing from the scope and spirit of the present invention. Each antenna 202, 204, and 206 has a corresponding radiation pattern 208, 210, and 212, respectively, which generally covers only one geographic sector or service region of the cell 200. However, as previously mentioned sectorized antennae radiation patterns are not typically shaped exactly like a sector of cell, rather antennae radiation patterns typically have a curved shape which can be manipulated to closely follow the rigid shape of a sector. Due to these curved shapes and a communication system constraint to provide all regions of a cell with service coverage from at least one antenna, the radiation patterns of the sectorized antennae will have overlapping regions in which two or more sectorized antennae provide service (e.g., overlapping service region 214).

In the preferred embodiment SFH-CDMA cellular communication system, each of antenna service regions 208 and 212 preferably may be assigned according to a communication channel reuse plan to operate within the same frequency band. Also, each antenna service region 208 and 212 preferably may be assigned according to the communication channel reuse plan to use the same codes to separate the communication channels within the frequency band. These codes assign distinct portions of the frequency band to different channels at different instances of time. Consequently, a mobile communication unit 228 within overlapping service region 214 may receive a signal from the central communication site 230 in a a particular frequency band assigned for use by a communication channel operating in antenna service region 208 as well as another communication channel operating in antenna service region 112. However, the mobile communication unit 228 having a radio communication link with the central communication site 230 would only be expecting a signal in the particular portion of the frequency band which is providing a communication channel from only one of the two antennae 202 and 206 (e.g., antenna 202) serving, respectively, antenna service regions 208 and 212. Therefore, the other signal transmitted by the other antenna (e.g., antenna 206) in the particular portion of the frequency band providing the communication channel would interfere with the radio communication link's expected signal. Such interference is known as co-channel interference.

Similarly, a mobile communication unit 228 having a radio communication link with central communication site 230 in the overlapping service region 214 may transmit a signal in a particular portion of the frequency band assigned for use by a communication channel operating in antenna service region 208 to antenna 202. However, antenna 206 would also receive the mobile communication unit's 228 transmitted signal. But, antenna 206 may be providing a radio communication link between the central communication site 230 and another mobile communication unit located in service region 212 through another communication channel which is assigned the same particular portion of the frequency band. As a result the signal transmitted by the mobile communication unit 228 in the communication channel would interfere with the radio communication link between the other mobile communication unit and antenna 206. Such interference is also known as co-channel interference.

This co-channel interference can be reduced by further having cell 200 include a second set of geographic service coverage regions or sectorized regions which are also each served by the central communication site 230 with a single antenna 216, 218 and 220, respectively. Each antenna 216, 218, and 220 has a corresponding radiation pattern 222, 224, and 226, respectively, which generally covers only one geographic sector or service region of the cell 200. This second set of geographic service regions (i.e., radiation patterns 222, 224 and 226) is preferably offset from the the first set of geographic service regions (i.e., radiation patterns 208, 210 and 212) such that the overlapping radiation patterns between the first set of antenna 202, 204, and 206 do not geographically overlap with the overlapping radiation patterns between the second set of antenna 216, 218, and 220. In the preferred embodiment this is accomplished by having the first and second set of antenna radiation patterns configured such that they have a sixty degrees (60°) rotational displacement from one another. It will be appreciated by those skilled in the art that the first and second set of antenna radiation or service regions may be configured with other rotational degrees of displacement so long as the overlapping service regions of the the first and second set of antenna patterns do not directly overlap one another.

The antenna service region 222 preferably is assigned according to the communication channel reuse plan to operate communication channels within a frequency band other than that which was assigned to antenna service regions 208 and 212. Also, antenna service region 222 preferably is assigned according to the communication channel reuse plan to use different codes to separate the communication channels within the assigned frequency band than those assigned to the service regions 208 and 212. It will be appreciated by those skilled in the art that it is only necessary for the service region 222 communication channel assignments to differ from the communication channel assignments services regions 208 and 212. Therefore, an alternative communication channel assignments may include operating service region 222 in the same frequency band, but using a different set of codes than service regions 208 and 212 such that the particular portions of the frequency band assigned to service regions 208 and 212 are not assigned to service region 222 at the same time. Also, another alternative communication channel assignment may include operating service region 222 with the same set of codes, but in a different frequency band than service regions 208 and 212. Similarly, the other service regions of the second set of service regions (i.e., service regions 224 and 226) are preferably assigned to operate communication channels in a frequency band and with set of codes which do not correspond to the frequency band and set of codes which are used by the first set of service regions 208, 210, and 212.

In order to reduce the possibility of co-channel interference in a communication link between one of first set of central communication site antennae 202, 204 and 206 and a mobile communication unit 228, a measure of the interference in the radio communication channel providing such a radio communication link is obtained. The measure of interference in the communication channel providing the communication link may be obtained from several sources. For example, power transmission levels of the antennae 202 and 206 in conjunction with an estimate of the mobile communication unit's 228 geographic position can be used to form an estimate of the interference in the communication channel carrying the signal transmitted and received by the mobile communication unit 228. Alternatively, an estimate of the carrier to interference power ratio of the signal received in the communication channel by either of the antenna 202, antenna 206, or mobile communication unit 228 can be used to form an estimate of the interference in the communication channel carrying the transmitted signal. Alternatively, the received bit error rate of the signal which was received in the communication channel by either of the antenna 202, antenna 206, or mobile communication unit 228 can be used to form an estimate of the interference in the communication channel carrying the transmitted signal. Depending upon the interference measurement technique used, such measurement of the interference in the communication channel providing the communication link may be determined by either the central communication site 230 or the mobile communication unit 228. It will be appreciated by those skilled in the art that the source of the interference in the communication channel may be something other than co-channel interference. Further, this preferred embodiment interference reduction technique may be extended for use in response to those other sources of interference without departing from the scope and spirit of the present invention.

After determining a measure of the interference is above a predetermined threshold, central communication site 230 preferably switches the radio communication link from the channel and antenna (e.g. antenna 202) providing the radio communication link to another antenna in the second set of antenna (e.g. antenna 216) which provides another communication channel for the radio communication link. As a result, the co-channel interference is reduced in the radio communication link between the central communication site 230 and the mobile communication unit 230 which is in overlapping service region 214.

It will be appreciated by those skilled in the art that narrow beam antenna may be used in place of the second set of antenna 216, 218 and 220 to provide the second set of service regions. These narrow beam antennae would not provide continuous service coverage over the entire cell 200. However, the communication link could be transferred to this second set of service regions while the mobile communication units are located in the overlapping service regions of the first set of antennae 202, 204, and 206. Thus, the co-channel interference would be reduced the communication link.

Figure 3A:
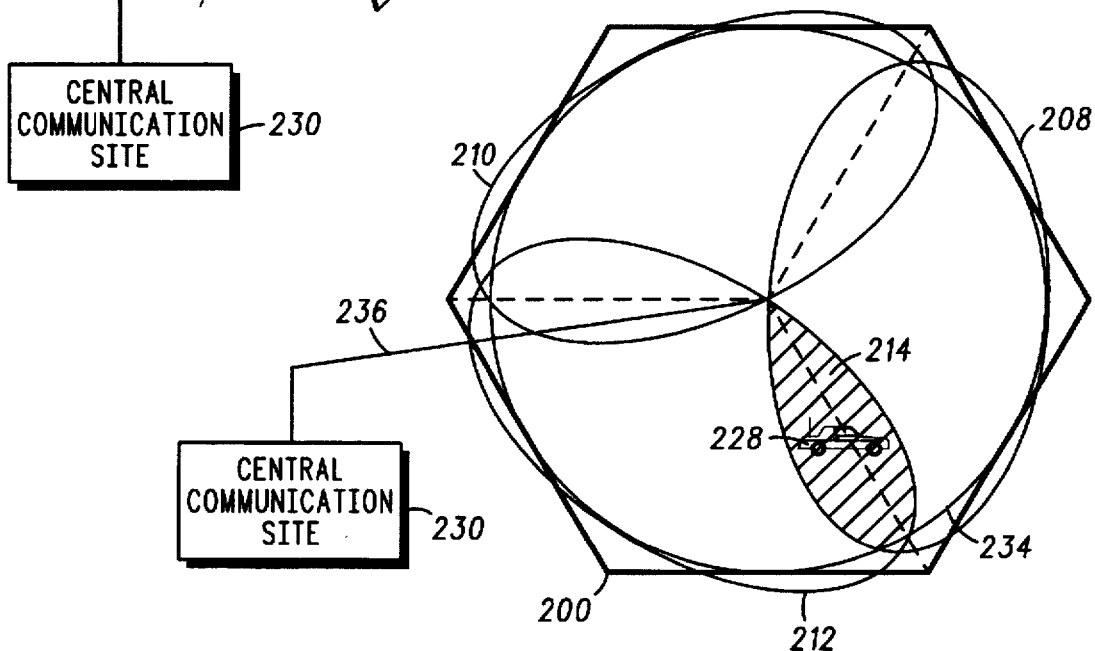
FIG. 3A and FIG. 3B are block diagrams showing an alternative preferred embodiment central communication site antenna pattern.
Figure 3B:
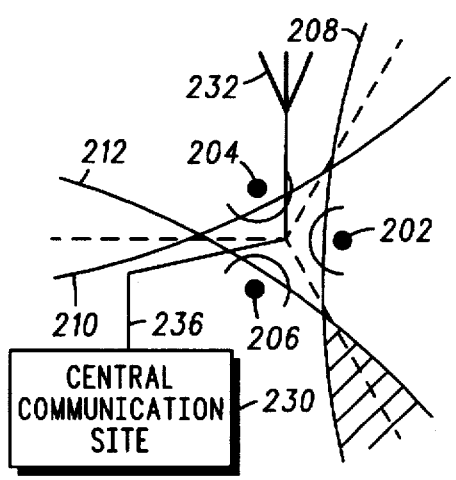

Another alternative preferred embodiment is shown in FIG. 3A and FIG. 3B. In this alternative embodiment, the second set of antenna and corresponding service regions include a single omni-directional antenna 232 and omni-directional service region 234. The omni-directional service region operates substantially like the second set of service regions 222, 224, and 226 and has the same channel assignment constraints.

It will also be appreciated by those skilled in the art that co-channel interference is a more significant problem in a communication link between central communication site 230 and mobile communication unit 228 when the mobile communication unit 228 is geographically proximate the serving antenna (e.g. antenna 202). This is due in part to the use of transmit power control. Therefore, an alternate preferred embodiment may include providing the second set of antenna and corresponding service regions such that the second set of service regions only cover a portion of cell 200 of the geographic area which is proximate the central communication site serving antennae.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, the antennas, antenna patterns, and communication channel assignments portions of the preferred embodiment communication system as described were directed to a SFH-CDMA spread spectrum communication system. However, as will be understood by those skilled in the art, the antennas, antenna patterns, and communication channel assignments described and claimed herein can also be adapted for use in other types of transmission systems like those based on FFH-CDMA, DS-CDMA, TDMA and FDMA.

What is claimed is:

1. A cellular communication system cell, comprising:
   (a) first sector antenna means for maintaining a radio communication link in a geographic region of the cell having a particular overlapped service region with a second sector antenna means serving an adjacent geographic region of the cell wherein a mobile communication unit is located within the particular overlapped service region by communicating a signal in a first communication channel between the first sector antenna means and the mobile communication unit;
   (b) omni antenna means located within the particular overlapped service region for maintaining the radio communication link in a geographic region which overlays the particular overlapped service region by communicating the signal in a second communication channel between the omni antenna means and the mobile communication unit;
   (c) means for determining a measure of interference in the first radio communication channel maintaining the radio communication link; and
   (d) means for switching the radio communication link from the first radio communication channel to the second radio communication channel, in response to the measure of interference being above a predetermined threshold.

2. The cellular communication system of claim 1 wherein the means for determining the measure of interference utilizes a measure selected from the group consisting essentially of power transmission levels of the first and second antenna in conjunction with an estimate of the geographic location of the mobile communication unit, an estimate of the carrier to interference power ratio of the received signal in the first communication channel, and received bit error rate of the signal in the first communication channel.

3. The cellular communication system of claim 1 wherein the first and the second radio communication channels comprise channels selected from the group consisting essentially of code division channels, time division channels and frequency division channels.

4. A cellular communication system, comprising:

(a) means for determining a measure of interference in a first radio communication channel, the first radio communication channel being provided through a radio communication link which communicates a signal between a first sector antenna of a cell and a mobile communication unit, the first sector antenna serving a geographic region of the cell having a particular overlapped service region with a second sector antenna serving an adjacent geographic region of the cell, wherein the mobile communication unit is located within the particular overlapped service region; and (b) means for switching the radio communication link, in response to the measure of interference being above a predetermined threshold, from the first radio communication channel to a second radio communication channel in which the signal is communicated between a third antenna of the cell and the mobile communication unit, the third antenna serving a geographic region which overlays at least a portion of the particular overlapped service region and has overlapped service regions with at least a portion of at least one further geographic region of an at least one other antenna, different from the first and second antennas, which is substantially non-overlapping with the particular overlapped service region.

5. The communication system of claim 4 wherein the means for determining the measure of interference utilizes a measure selected from the group consisting essentially of power transmission levels of the first and second antenna in conjunction with an estimate of the geographic location of the mobile communication unit, an estimate of the carrier to interference power ratio of the received signal in the first communication channel, and received bit error rate of the signal in the first communication channel.

6. The communication system of claim 4 wherein the first and the second radio communication channels comprise channels selected from the group consisting essentially of code division channels, time division channels and frequency division channels.

7. The communication system of claim 4 wherein the third antenna comprises an antenna selected from the group consisting essentially of omni-directional antenna, sector antenna, and narrow beam antenna.

* * * * *